(12) United States Patent
Wang

(10) Patent No.: US 11,431,914 B2
(45) Date of Patent: Aug. 30, 2022

(54) SYSTEMS AND METHODS FOR DETERMINING EXPOSURE PARAMETERS

(71) Applicant: ZHEJIANG DAHUA TECHNOLOGY CO., LTD., Zhejiang (CN)

(72) Inventor: Jianmiao Wang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 74 days.

(21) Appl. No.: 17/006,942

(22) Filed: Aug. 31, 2020

(65) Prior Publication Data
US 2020/0396363 A1 Dec. 17, 2020

Related U.S. Application Data

(63) Continuation of application No. PCT/CN2019/082111, filed on Apr. 10, 2019.

(30) Foreign Application Priority Data

Apr. 11, 2018 (CN) .......................... 201810321211.3

(51) Int. Cl.
H04N 5/235 (2006.01)
H04N 13/204 (2018.01)
H04N 5/247 (2006.01)

(52) U.S. Cl.
CPC ......... *H04N 5/2351* (2013.01); *H04N 5/2353* (2013.01); *H04N 5/247* (2013.01); *H04N 13/204* (2018.05)

(58) Field of Classification Search
CPC .... H04N 5/2351; H04N 5/2353; H04N 5/247; H04N 13/204; H04N 7/18; H04N 5/2352; H04N 5/23238; H04N 5/262; H04N 7/181
See application file for complete search history.

(56) References Cited

U.S. PATENT DOCUMENTS 6,813,391 B1 * 11/2004 Uyttendaele ............. G06K 9/03
345/629
9,466,109 B1 10/2016 Adsumilli et al.
(Continued)

FOREIGN PATENT DOCUMENTS

CN 104320593 A 1/2015
CN 105430285 A 3/2016
(Continued)

OTHER PUBLICATIONS

The Extended European Search Report in European Application No. 19784824.5 dated Feb. 24, 2021, 8 pages.
(Continued)

*Primary Examiner* — Jason A Flohre
(74) *Attorney, Agent, or Firm* — Metis IP LLC

(57) ABSTRACT

The present disclosure relates to a method for determine exposure parameters of each camera in a multi-view camera. The method may initiate an iteration process including iteration(s). Each current iteration may include: determining a reference exposure brightness; determining whether a first difference between the reference exposure brightness and a predetermined exposure brightness is within a first difference-range; if the first difference is not within the first difference-range, updating a first exposure brightness of each camera by adjusting first exposure parameters of the camera, and re-initiating a current iteration; if the first difference is within the first difference-range, designating the first exposure parameters of each camera as the current exposure parameters of the camera.

18 Claims, 9 Drawing Sheets

(56) References Cited

U.S. PATENT DOCUMENTS

| | | | |
|---|---|---|---|
| 10,887,527 B2* | 1/2021 | Numata | G03B 37/02 |
| 10,957,047 B2* | 3/2021 | Wang | H04N 5/232 |
| 2004/0228544 A1* | 11/2004 | Endo | G06T 3/4038 |
| | | | 382/284 |
| 2013/0278802 A1 | 10/2013 | Attar et al. | |
| 2014/0375759 A1 | 12/2014 | Mikes | |
| 2015/0116453 A1* | 4/2015 | Hirata | H04N 5/23206 |
| | | | 348/38 |
| 2016/0234437 A1* | 8/2016 | Kuwada | H04N 5/23238 |
| 2017/0257568 A1 | 9/2017 | Kim et al. | |
| 2018/0278854 A1* | 9/2018 | Kottel | H04N 5/23238 |
| 2020/0020075 A1* | 1/2020 | Khwaja | G06T 5/002 |
| 2020/0154025 A1* | 5/2020 | Wakatsuki | H04N 5/2351 |

FOREIGN PATENT DOCUMENTS

| | | | |
|---|---|---|---|
| CN | 107566730 A | 1/2018 | |
| CN | 107635101 A | 1/2018 | |
| EP | 2978215 A1 | 1/2016 | |
| WO | 2012043063 A1 | 4/2012 | |
| WO | 2019196879 A1 | 10/2019 | |

OTHER PUBLICATIONS

International Search Report in PCT/CN2019/082111 dated Jul. 9, 2019, 4 pages.
Written Opinion in PCT/CN2019/082111 dated Jul. 9, 2019, 5 pages.
First Office Action in Chinese Application No. 201810321211.3 dated Jun. 26, 2019, 9 pages.

* cited by examiner

Image 1'   Image 2'   Image 3'

Reg1'   Reg2'

SYSTEMS AND METHODS FOR DETERMINING EXPOSURE PARAMETERS

CROSS-REFERENCE TO RELATED APPLICATIONS

This application is a Continuation of International Application No. PCT/CN2019/082111 filed on Apr. 10, 2019, which claims priority to Chinese Application No. 201810321211.3, filed on Apr. 11, 2018, the entire contents of each of which are hereby incorporated by reference.

TECHNICAL FIELD

The present disclosure relates to the field of optimizing multi-view cameras, and in particular, to systems and methods for determining exposure parameters for each camera in a multi-view camera.

BACKGROUND

Video surveillance is becoming more and more important for security purposes, and is widely used in various locations, such as roads, shopping malls, residential areas, parking lots, etc. because it is accurate, timely, and informative. In recent years, with the advancement of technology, video surveillance techniques have developed rapidly. In some cases, monocular cameras are stilled used for surveillance cameras. However, the field of view (FOV) of a monocular camera is relatively small, making it difficult to capture wide-range images. Thus, multi-view cameras that include multiple cameras are utilized in more and more occasions to generate wide-range images. Commonly, a wide-range image (also referred to as stitched image) is generated by digitally stitching multiple images captured by the cameras in the multi-view camera. To obtain a stitched image with high quality, it would be ideal that the exposure brightness of each image is in common range and the exposure brightness at the stitching region in the stitched image is uniform. The existing multi-view cameras, however, are not set up in a manner to achieve this goal. Thus, it is desirable to provide systems and methods for determining improved exposure parameters for each camera so that better digital images can be produced by the multi-view camera.

SUMMARY

In one aspect of the present disclosure, a system is provided. The system may include at least one storage device, and at least one processing device in communication with the at least one storage device. The at least one storage device may include a set of instructions for determining exposure parameters of each of a plurality of cameras in a multi-view camera. When executing the set of instructions, the at least one processor may be configured to cause the system to initiate an iteration process including one or more iterations. Each current iteration of the one or more iterations may include determining a reference exposure brightness of the multi-view camera; determining whether a first difference between the reference exposure brightness and a predetermined exposure brightness is within a first difference-range; in response to a determination that the first difference is not within the first difference-range, for each camera of the plurality of cameras, updating a first exposure brightness of the camera by adjusting first exposure parameters of the camera, and re-initiating a current iteration; or in response to a determination that the first difference is within the first difference-range, determining whether a second difference between a second exposure brightness of a second camera and a third exposure brightness of a reference camera is within a second difference-range, wherein the second exposure brightness and the third exposure brightness correspond to an overlapping region of digital images taken by the second camera and the reference camera; in response to a determination that the second difference is not within the second difference-range, updating the first exposure brightness of the second camera by adjusting the first exposure parameters of the second camera; and re-initiating a current iteration; or in response to a determination that the second difference is within the second difference-range, terminating the iteration process; and designating the first exposure parameters of each camera as the current exposure parameters of the camera.

In some embodiments, the first exposure parameters may include an exposure time and a gain value.

In some embodiments, the system may further include determining the second exposure brightness of the second camera and the third exposure brightness of the reference camera by: obtaining a plurality of first images by the plurality of cameras with the first exposure parameters; determining, among the plurality of first images, a reference image and a second image that has the overlapping region with the reference image; and extracting the second exposure brightness of the second camera corresponding to the second image and the third exposure brightness of the reference camera corresponding to the reference image based on the overlapping region.

In some embodiments, updating the first exposure brightness of the second camera by adjusting the first exposure parameters of the second camera may include: adjusting the first exposure parameters of the second camera based on the second difference; determining a fourth exposure brightness of the second camera based on the adjusted exposure parameters; and determining a ratio of the first exposure brightness to the fourth exposure brightness as a correction coefficient of the second camera.

In some embodiments, the reference exposure brightness of the multi-view camera may be determined based on the first exposure brightnesses of the plurality of cameras with a process that includes: determining a weighted average of the plurality of first exposure brightnesses of the plurality of cameras based on the correction coefficient of the second camera; and designating the weighted average as the reference exposure brightness of the multi-view camera.

In some embodiments, updating the first exposure brightness of each camera by adjusting the first exposure parameters of the each camera may include adjusting the first exposure parameters of each camera based on the first difference, and determining an updated exposure brightness of each camera based on the adjusted exposure parameters.

In some embodiments, before initiating the iteration process, the at least one processor may be further configured cause the system to: obtain a plurality of third images by the plurality of cameras with the first exposure parameters; identify two or more third images that overlaps with each other; determine whether a size of each overlapping region between the identified two or more third images satisfies a size criterion; and in response to a determination that the size of the each overlapping region satisfies the size criterion, initiate the iteration process.

In some embodiments, the size criterion may be set based on a size of the identified one or more third images.

In some embodiments, an exposure mode of each of the plurality of cameras may be automatic exposure.

In some embodiments, for a first iteration, the reference exposure brightness of the multi-view camera may be determined based on a plurality of initial exposure brightnesses of the plurality of cameras. The plurality of initial exposure brightnesses may be determined based on a plurality of initial exposure parameters.

In another aspect of the present disclosure, a method is provided. The method may be implemented on a computing device having at least one processor, at least one computer-readable storage medium, and a communication platform connected to a network. The method may include initiating an iteration process including one or more iterations. Each current iteration of the one or more iterations may include: determining a reference exposure brightness of the multi-view camera; determining whether a first difference between the reference exposure brightness and a predetermined exposure brightness is within a first difference-range; in response to a determination that the first difference is not within the first difference-range, for each camera of the plurality of cameras, updating a first exposure brightness of the camera by adjusting first exposure parameters of the camera, and re-initiating a current iteration; or in response to a determination that the first difference is within the first difference-range, determining whether a second difference between a second exposure brightness of a second camera and a third exposure brightness of a reference camera is within a second difference-range, wherein the second exposure brightness and the third exposure brightness correspond to an overlapping region of digital images taken by the second camera and the reference camera; in response to a determination that the second difference is not within the second difference-range, updating the first exposure brightness of the second camera by adjusting the first exposure parameters of the second camera; and re-initiating a current iteration; or in response to a determination that the second difference is within the second difference-range, terminating the iteration process; and designating the first exposure parameters of each camera as the current exposure parameters of the camera.

In yet another aspect of the present disclosure, a non-transitory computer-readable storage medium is provided. The non-transitory computer-readable storage medium may include at least one set of instructions. When executed by at least one processor of a computing device, the at least one set of instructions may direct the at least one processor to perform acts of initiating an iteration process including one or more iterations. Each current iteration of the one or more iterations may include: determining a reference exposure brightness of the multi-view camera; determining whether a first difference between the reference exposure brightness and a predetermined exposure brightness is within a first difference-range; in response to a determination that the first difference is not within the first difference-range, for each camera of the plurality of cameras, updating a first exposure brightness of the camera by adjusting first exposure parameters of the camera, and re-initiating a current iteration; or in response to a determination that the first difference is within the first difference-range, determining whether a second difference between a second exposure brightness of a second camera and a third exposure brightness of a reference camera is within a second difference-range, wherein the second exposure brightness and the third exposure brightness correspond to an overlapping region of digital images taken by the second camera and the reference camera; in response to a determination that the second difference is not within the second difference-range, updating the first exposure brightness of the second camera by adjusting the first exposure parameters of the second camera; and re-initiating a current iteration; or in response to a determination that the second difference is within the second difference-range, terminating the iteration process; and designating the first exposure parameters of each camera as the current exposure parameters of the camera.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
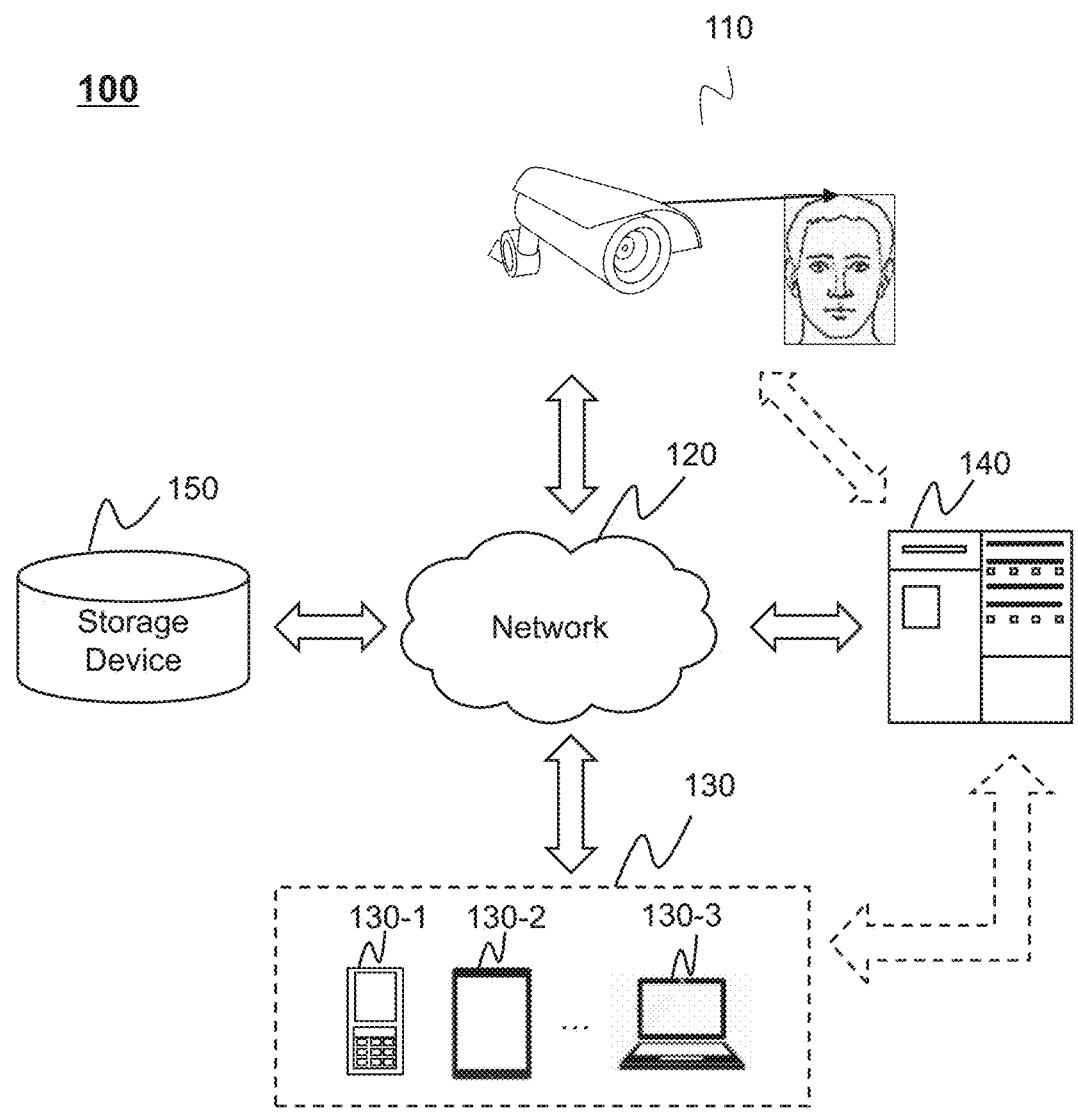
FIG. 1 is a schematic diagram illustrating an exemplary image processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or another storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The present disclosure relates to systems and methods for determining exposure parameters of each camera in a multi-view camera. The systems and methods may initiate an iteration process including one or more iterations. In each current iteration, the systems and methods may determine a reference exposure brightness of the multi-view camera, and determine whether a first difference between the reference exposure brightness and a predetermined exposure brightness is within a first difference-range. The predetermined exposure brightness may be related to a gain value. If the first difference is not within the first difference-range, for each camera, the systems and methods may adjust exposure parameters of the camera based on the first difference, and update a first exposure brightness of the camera based on the adjusted exposure parameters. Alternatively, if the first difference is within the first difference-range, the systems and methods may determine whether a second difference between a second exposure brightness of a second camera and a third exposure brightness of a reference camera is within a third difference-range. The second exposure brightness and the third exposure brightness may correspond to an overlapping region of digital images taken by the second camera and the reference camera. If the second difference is not within the second difference-range, the systems and methods may adjust the first exposure parameters of the second camera based on the second difference, and update the first exposure brightness of the second camera based on the adjusted exposure parameters. Alternatively, if the second difference is within the second difference-range, the systems and methods may terminate the iteration process and designate the first exposure parameters of each camera as the current exposure parameters of the camera.

FIG. 1 is a schematic diagram illustrating an exemplary image processing system 100 according to some embodiments of the present disclosure. The image processing system 100 may be configured for determining an exposure parameter of each of a plurality of cameras in a multi-view camera. The image processing system 100 may include a capture device 110, a network 120, a terminal 130, a processing device 140, and a storage device 150. The components of the image processing system 100 may be connected to each other in various ways. Merely by way of example, as illustrated in FIG. 1, the capture device 110 may be connected to the processing device 140 via the network 120. As another example, the capture device 110 may be connected to the processing device 140 directly as indicated by the bi-directional arrow in dotted lines linking the capture device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

The capture device 110 may be configured to capture one or more images. As used in this application, an image may be a still image, a video, a stream video, or a video frame obtained from a video, or the like. The image may be a two-dimensional (2D) image, a three-dimensional (3D) image, or the like. The capture device 110 may be or include a multi-view camera including a plurality of cameras. In some embodiments, the capture device 110 may be a digital camera, a video camera, a security camera, a web camera, a smartphone, a tablet, a laptop, a video gaming console equipped with a web camera, a camera with multiple lenses, a camcorder, etc.

The network 120 may facilitate the exchange of information and/or data. In some embodiments, one or more components of the image processing system 100 (e.g., the capture device 110, the terminal 130, the processing device 140, the storage device 150) may send information and/or data to another component(s) in the image processing system 100 via the network 120. For example, the processing device 140 may process an image obtained from the capture device 110 via the network 120. As another example, the capture device 110 may obtain user instructions from the terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the image processing system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a HoloLens™, a Gear VR™, etc. In some embodiments, the terminal 130 may remotely operate the capture device 110. In some embodiments, the terminal 130 may operate the capture device 110 via a wireless connection. In some embodiments, the terminal 130 may receive information and/or instructions inputted by a user, and send the received information and/or instructions to the capture device 110 or to the processing device 140 via the network 120. In some embodiments, the terminal 130 may be part of the processing device 140. In some embodiments, the terminal 130 may be omitted.

In some embodiments, the processing device 140 may process data obtained from the capture device 110, the terminal 130, or the storage device 150. The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local to or remote from one or more other components of the image processing system 100. For example, the processing device 140 may access information and/or data stored in the capture device 110, the terminal 130, and/or the storage device 150 via the network 120. As another example, the processing device 140 may be directly connected to the capture device 110, the terminal 130, and/or the storage device 150, to access stored information and/or data. In some embodiments, the processing device 140 may be implemented on a cloud platform.

Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be independent of the capture device 110 or be part of the capture device 110. For example, the processing device 140 may be a device independent of a multi-view camera. As another example, the processing device 140 may be one component of a multi-view camera.

In some embodiments, the processing device 140 may determine exposure parameters of each camera in a multi-view camera. In some embodiments, to determine the exposure parameters of each camera, the processing device 140 may initiate an iteration process including one or more iterations. In each current iteration, the processing device 140 may determine a reference exposure brightness of the multi-view camera. For a first iteration, the plurality of first exposure brightnesses may include a plurality of initial exposure brightnesses, which may be determined based on a plurality of initial exposure parameters stored in the image processing system 100 or the multi-view camera. In some embodiments, the (initial) exposure parameters may include an exposure time, a gain, or the like. In some embodiments, the (initial) exposure parameters may include an aperture value, an ISO, and a shutter speed. In each current iteration, the processing device 140 may determine whether a first difference between the reference exposure brightness and a predetermined exposure brightness is within a first difference-range. In response to a determination that the first difference is not within the first difference-range, for each camera, the processing device 140 may update a first exposure brightness of the camera by adjusting first exposure parameters of the camera. For instance, the processing device 140 may adjust the first exposure parameters of each camera based on the first difference, and determine an updated exposure brightness of each camera based on the adjusted exposure parameters. The processing device 140 may designate the updated exposure brightness of each camera as the first exposure brightness and the adjusted exposure parameters of each camera as the first exposure parameters. Then the processing device 140 may re-initiate a current iteration. In the reinitiated iteration, the processing device 140 may determine the reference exposure brightness based on the first exposure brightness of each camera.

Alternatively, in response to a determination that the first difference is within the first difference-range, the processing device 140 may determine whether a second difference between a second exposure brightness of a second camera and a third exposure brightness of a reference camera is within a second difference-range. The second exposure brightness and the third exposure brightness may correspond to an overlapping region of digital images taken by the second camera and the reference camera. In some embodiments, to determine the second exposure brightness and the third exposure brightness, the processing device 140 may obtain a plurality of first images by the plurality of cameras with the first exposure parameters, and determine, among the plurality of first images, a reference image and a second image that has the overlapping region with the reference image. The exposure mode of each camera may be automatic exposure. The processing device 140 may then extract the second exposure brightness of the second camera corresponding to the second image and the third exposure brightness of the reference camera corresponding to the reference image based on the overlapping region. In response to a determination that the second difference is not within the second difference-range, the processing device 140 may update the first exposure brightness of the second camera by adjusting the first exposure parameters of the second camera. For instance, the processing device 140 may adjust the first exposure parameters of the second camera based on the second difference, and determine a fourth exposure brightness of the second camera based on the adjusted exposure parameters. The processing device 140 may determine a ratio of the first exposure brightness to the fourth exposure brightness as a correction coefficient of the second camera. The processing device 140 may designate the updated (or fourth) exposure brightness of the second camera as the first exposure brightness and the adjusted exposure parameters of the second camera as the first exposure parameters. Then processing device 140 may re-initiate a current iteration. In the reinitiated iteration, the processing device 140 may determine a weighted average of the plurality of first exposure brightnesses of the plurality of cameras based on the correction coefficient of the second camera. The processing device 140 may designate the weighted average as the reference exposure brightness. Alternatively, in response to a determination that the second difference is within the second difference-range, the processing device 140 may terminate the iteration process and designate the first exposure parameters of each camera as the current exposure parameters of the camera. Details regarding the determination of the first exposure parameters of each camera may be found elsewhere in the present disclosure (e.g., FIGS. 4 and 6, and the descriptions thereof).

In some embodiments, before initiating the iteration process, the processing device 140 may obtain a plurality of third images by the plurality of cameras with the first exposure parameters (e.g., the initial exposure parameters). The exposure mode of each camera may be automatic exposure. The processing device 140 may identify two or more third images that overlaps with each other, and determine whether a size of each overlapping region between the identified two or more third images satisfies a size criterion. In some embodiments, the size criterion may be set based on a size of the identified one or more third images. In response to a determination that the size of each overlapping region satisfies the size criterion, the processing device 140 may initiate the iteration process.

The storage device 150 may store data and/or instructions. In some embodiments, the storage device 150 may store data or images obtained from the capture device 110, the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the image processing system 100 (e.g., the capture device 110, the terminal 130, the processing device 140). One or more components in the image processing system 100 may access the data or instructions stored in the storage device 150 via the network 120. In some embodiments, the storage device 150 may be directly connected to or communicate with one or more components in the image processing system 100 (e.g., the capture device 110, the terminal 130, the processing device 140). In some embodiments, the storage device 150 may be part of the capture device 110, or the processing device 140.

Figure 2:
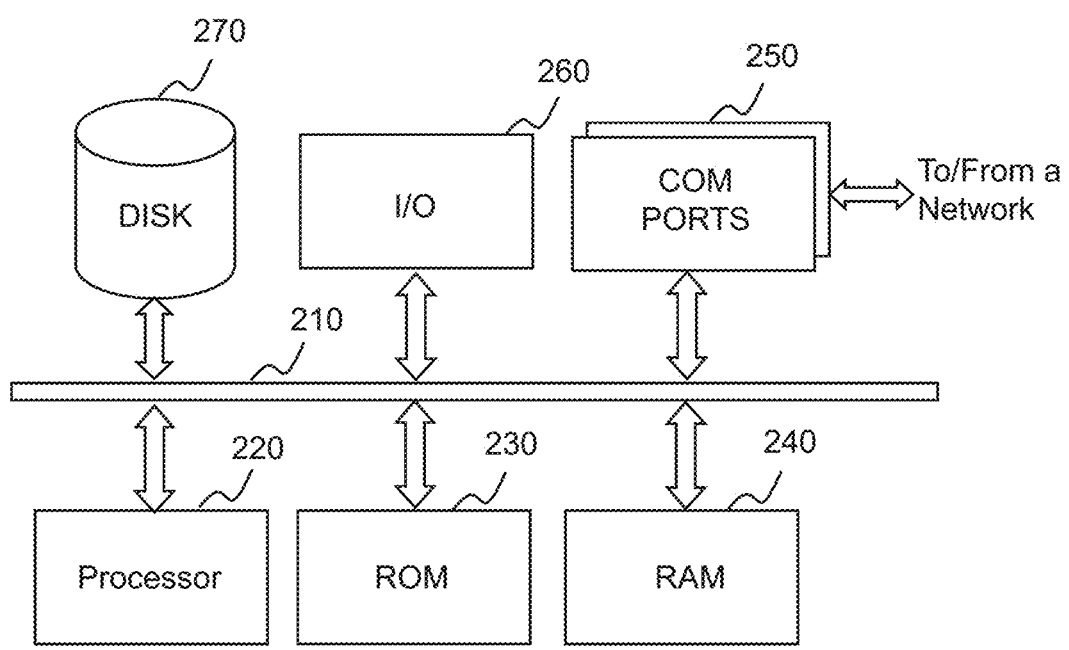
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. In some embodiments, the capture device 110, the terminal 130, the processing device 140 may be implemented on the computing device 200. For example, the processing device 140 may be implemented on the computing device 200 and configured to perform functions of the processing device 140 disclosed in this disclosure.

The computing device 200 may be a special purpose computer used to implement an image processing system for the present disclosure. The computing device 200 may be used to implement any component of the image processing system as described herein. For example, the processing device 140 may be implemented on the computing device, via its hardware, software program, firmware, or a combination thereof. Although only one such computer is shown, for convenience, the computer functions relating to the image processing as described herein may be implemented in a distributed fashion on a number of similar platforms, to distribute the processing load.

The computing device 200, for example, may include a COM port 250 connected to and/or from a network connected thereto to facilitate data communications. The computing device 200 may also include a processor 220, in the form of one or more processors (or CPUs), for executing program instructions. The exemplary computing device may include an internal communication bus 210, different types of program storage units and data storage units (e.g., a disk 270, a read only memory (ROM) 230, a random access memory (RAM) 240), various data files applicable to computer processing and/or communication. The exemplary computing device may also include program instructions stored in the ROM 230, RAM 240, and/or another type of non-transitory storage medium to be executed by the processor 220. The method and/or process of the present disclosure may be implemented as the program instructions. The computing device 200 also includes an I/O device 260 that may support the input and/or output of data flows between the computing device 200 and other components. The computing device 200 may also receive programs and data via the communication network.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes operation A and the second processor executes operation B, or the first and second processors jointly execute operations A and B).

Figure 3:
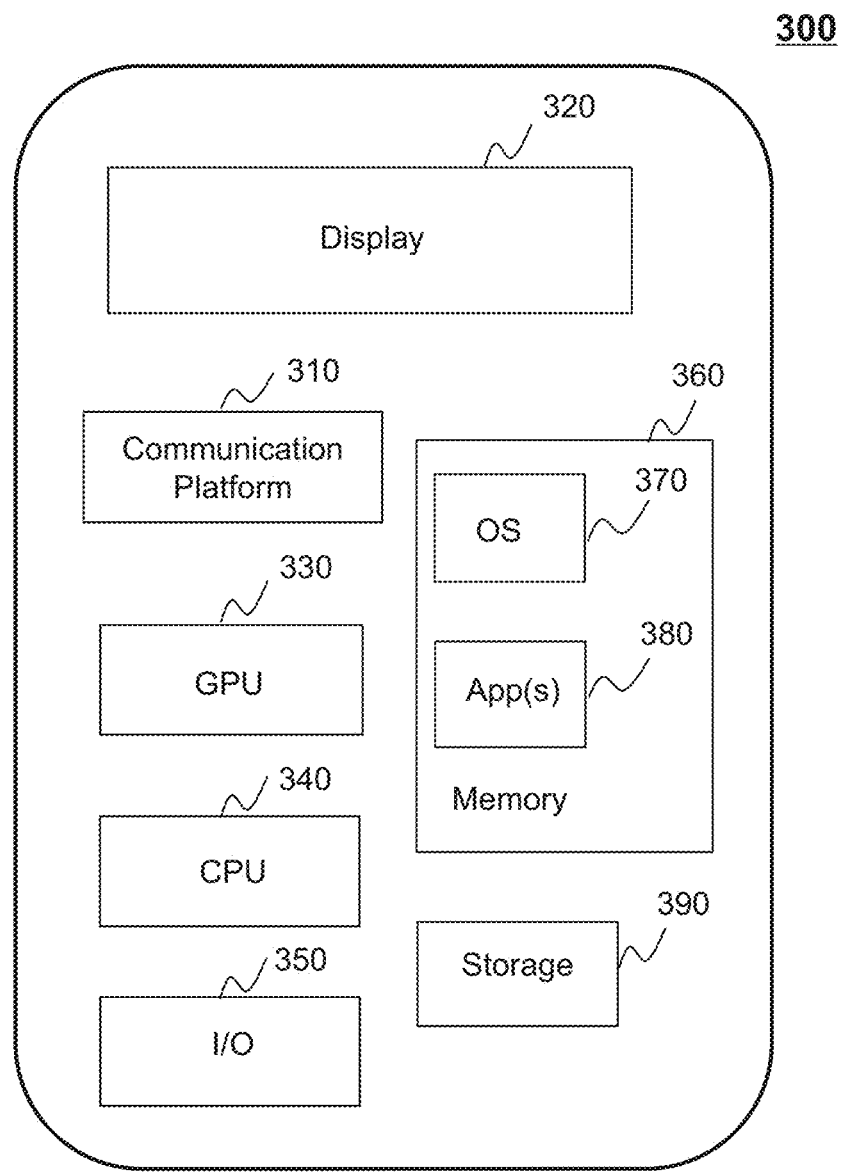
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the mobile device 300 may be an exemplary embodiment corresponding to the terminal 130. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the image processing system 100. User interactions with the information stream may be achieved via the I/O 350 and provided to the storage device 150, the capture device 110 and/or other components of the image processing system 100.

To implement various modules, units, and their functionalities described in the present disclosure, computer hardware platforms may be used as the hardware platform(s) for one or more of the elements described herein. A computer with user interface elements may be used to implement a personal computer (PC) or any other type of workstation or terminal device. A computer may also act as a system if appropriately programmed.

Figure 4:
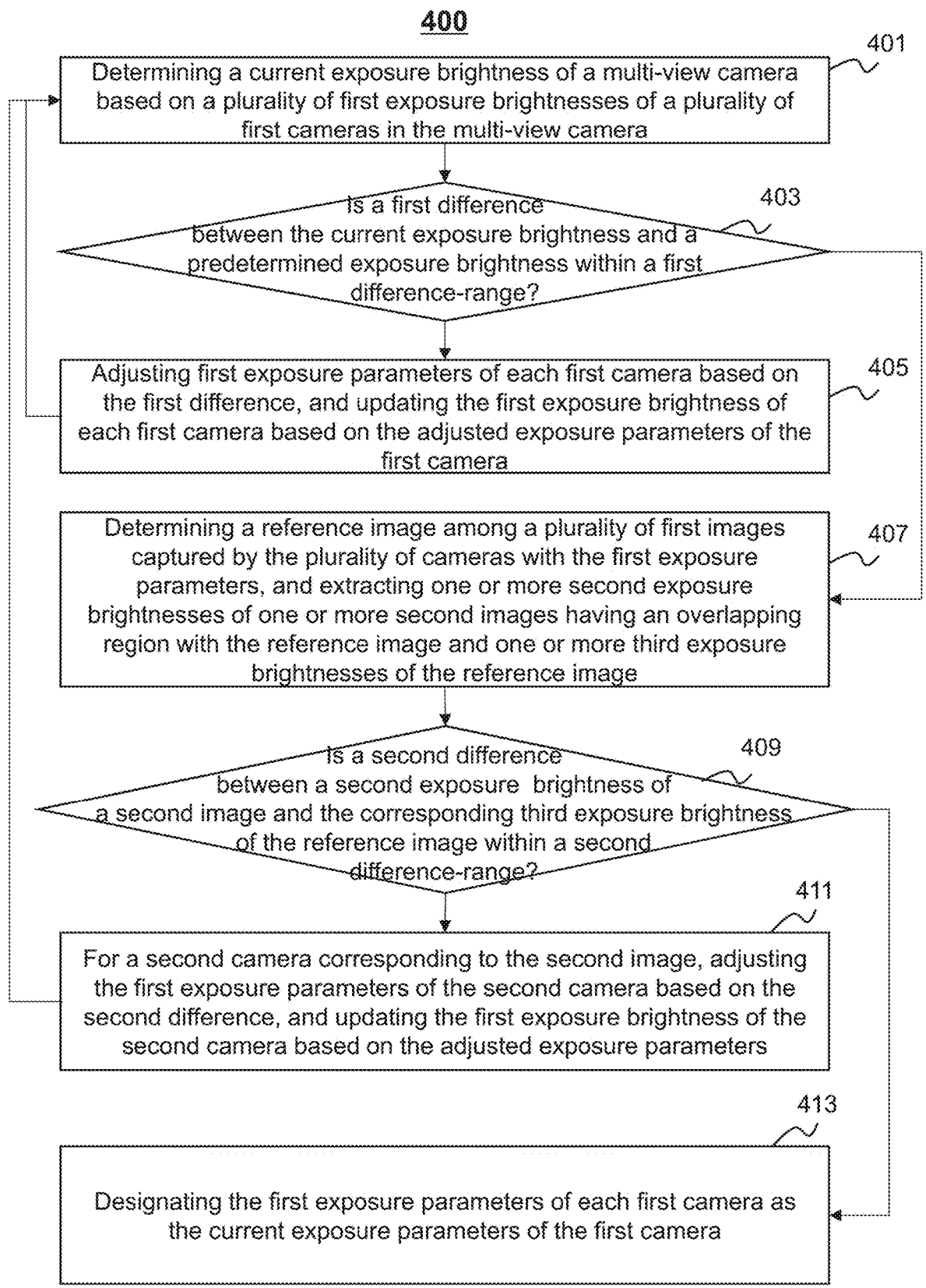
FIG. 4 is a flowchart illustrating an exemplary process 400 for determining exposure parameters of each camera in a multi-view camera according to some embodiments of the present disclosure.

FIG. 4 is a flowchart illustrating an exemplary process 400 for determining exposure parameters of each camera in a multi-view camera according to some embodiments of the present disclosure. For illustration purpose only, the processing device 140 may be described as a subject to perform the process 400. However, one of ordinary skill in the art would understand that the process 400 may also be performed by other entities. For example, one of ordinary skill in the art would understand that at least a portion of the process 400 may also be implemented on the computing device 200 as illustrated in FIG. 2 or the mobile device 300 as illustrated in FIG. 3. In some embodiments, one or more operations of process 400 may be implemented in the image processing system 100 as illustrated in FIG. 1. In some embodiments, one or more operations in the process 400 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in the form of electronic current or electrical signals.

The process 400 disclosed herein may be applied to a multi-view camera. A multi-view camera may include a plurality of cameras having different views. Each of the plurality of cameras may include an image sensor. In some embodiments, the image sensor may include a charge-coupled device (CCD), a complementary metal-oxide semiconductor (CMOS), an electron multiplying charge coupled device (EMCCD), or the like, or any combination thereof. The image sensor of each camera may be used to capture brightness information which is used to generate an image. A plurality of images may be digitally stitched into a stitched image. To avoid exposure abnormalities (e.g., overexposure, underexposure) in the stitched image, each camera should have a normal exposure brightness, which may depend on exposure parameters of the camera. Thus, it is desirable to determine suitable exposure parameters for each camera. In some embodiments, the exposure parameters of each camera may be determined according to the process 400 by performing an iteration process that includes one or more iterations.

In 401, the processing device 140 (e.g., a first judgment module 1101) may determine a current exposure brightness (also referred to as a reference exposure brightness) of a multi-view camera based on a plurality of first exposure brightnesses of a plurality of first cameras in the multi-view camera.

In some embodiments, a first exposure brightness of a first camera may be related to brightness information obtained by an image sensor of the first camera. For instance, an image sensor may include a plurality of photosensitive elements each of which corresponds to a brightness value. The first exposure brightness of the first camera may be an average value of brightness values of the photosensitive elements.

In some embodiments, for a first iteration, the processing device 140 may determine the first exposure brightness of each first camera based on initial exposure parameters of the corresponding first camera. For example, the first exposure brightness of a first camera may be determined by taking an image with initial exposure parameters of the first camera. The initial exposure parameters may include an exposure time, a gain value, an aperture, or the like, or any combination thereof. In some embodiments, the initial exposure parameters of different first cameras may be the same or different. The initial exposure parameters of each first camera may be preset exposure parameters set by the image processing system 100 or the multi-camera. The processing device 140 may obtain the initial exposure parameters of each first camera form a storage device (e.g., the storage device 150, the ROM 230, the storage 390, the storage 1003, or the like), or from an external source (e.g., a database).

In some embodiments, the first exposure brightnesses of different first cameras may be the same or different. It should be noted that the first exposure brightness of each first camera may vary under different conditions. For example, in daytime, the first exposure brightness of a first camera may be relatively large, while at night, the first exposure brightness of the first camera may be relatively small.

In some embodiments, the processing device 140 may determine a weighted average of the plurality of first exposure brightnesses of the plurality of first cameras. In some embodiments, each first camera may be assigned with a weight. The weight of each first camera may be a default value or an empirical value. In some embodiments, the weight of each first camera may be a default value of the image processing system 100 or the multi-view camera. Alternatively, the weight of each first camera may be determined and/or adjusted based on, e.g., the first exposure brightness of each first camera. In some embodiments, the weights of the plurality of first cameras may be the same. In this case, the processing device 140 may directly determine an average of the plurality of first exposure brightnesses. Alternatively, the weights of at least two first cameras may be different. In this case, the processing device 140 may determine a weighted average of the plurality of first exposure brightnesses based on the weights of the first cameras. The processing device 140 may determine the weighted average as the current exposure brightness of the multi-view camera. In some embodiments, the current exposure brightness of the multi-view camera may change with the change of the plurality of exposure brightnesses.

In 403, the processing device 140 (e.g., the first judgment module 1101) may determine whether a first difference between the current exposure brightness and a predetermined exposure brightness is within a first difference-range. The predetermined exposure brightness may be manually set by a user or automatically adjusted by the multi-view camera according to actual scenes. For example, in daytime, the predetermined exposure brightness may be assigned/set with a greater value, while at night, the predetermined exposure brightness may be assigned/set with a smaller value. In some embodiments, the predetermined exposure brightness may be related to a gain value. The less the gain value is, the greater the predetermined exposure brightness is.

The first difference-range may be a default difference-range or an empirical difference-range. For example, the first difference-range may be set according to a default setting of the image processing system 100 or the multi-view camera. As another example, the first difference-range may be a brightness tolerance range, e.g., within −5 and 5, within −5 and 10, or the like. In some embodiments, the first difference between the current exposure brightness and the predetermined exposure brightness may be a positive value or a negative value. In response to a determination that the first difference is not within the first difference-range, the processing device 140 may proceed to operation 405.

In 405, the processing device 140 (e.g., a first updating module 1103) may adjust first exposure parameters of each first camera based on the first difference. The processing device 140 may update the first exposure brightness of each first camera based on the adjusted exposure parameters of the first camera.

If the first difference between the current exposure brightness and the predetermined exposure brightness is not within the first difference-range, it may indicate that the first exposure brightnesses of the plurality of first cameras are not suitable for the actual scenes. Thus, the processing device 140 may adjust the first exposure parameters of each first camera to update the first exposure brightness of each first camera.

The first exposure parameters of each first camera may include an exposure time, a gain value, an aperture, or the like, or any combination thereof. The first exposure parameters of different first cameras may be the same or different. In certain embodiments, the first exposure parameters of the plurality of first cameras may be set with the same value. For the first iteration, the first exposure parameters of each first camera may be the initial exposure parameters of the first camera.

In some embodiments, the processing device 140 may adjust the first exposure parameters based on the positive or negative of the first difference and/or the size of the first difference. For example, if the first difference is a positive value, the processing device 140 may decrease the first exposure parameters according to the size of the first difference. As another example, if the first difference is a negative value, the processing device 140 may increase the first exposure parameters according to the size of the first difference.

In some embodiments, the first exposure parameters of each first camera may be adjusted according to a certain rule. For example, the processing device 140 may adjust the first exposure parameters according to the weights of the plurality of first cameras. As another example, the processing device 140 may determine a parameter ratio for each first exposure parameters based on the plurality of first exposure parameters. The processing device 140 may adjust each first exposure parameters according to its parameter ratio. As a further example, the processing device 140 may increase or decrease the first exposure parameters with the same value. It should be noted that the first exposure parameters may be adjusted randomly as long as the first difference can be reduced.

The processing device 140 may update the first exposure brightness of each first camera based on the adjusted exposure parameters. For example, the updated exposure brightness of a first camera may be determined by taking an image with the adjusted exposure parameters of the first camera. In some embodiments, the processing device 140 may designate the updated exposure brightness of each first camera as the first exposure brightness and the adjusted exposure parameters as the first exposure parameters. Then the processing device 140 may proceed to operation 401 and start a next iteration. In some embodiments, operations 401 to 405 may be repeated until the first difference between the current exposure brightness and the predetermined exposure brightness is within the first difference-range.

Returning to operation 403, if the first difference between the current exposure brightness and the predetermined exposure brightness is within the first difference-range, it may indicate that the first exposure brightnesses of the plurality of first cameras are suitable for the actual scenes. However, due to the different views of the plurality of first cameras, light entering different first cameras may be different, thus resulting in non-uniform of exposure brightness at an overlapping region of two images that have the overlapping region. Therefore, the exposure brightnesses of one or more first cameras corresponding to the images having overlapping regions may be further updated according to the following operation(s).

In 407, the processing device 140 (e.g., a second updating module 1105) may determine a reference image among a plurality of first images captured by the plurality of first cameras with the plurality of first exposure parameters. The processing device 140 (e.g., the second updating module 1105) may further extract one or more second exposure brightnesses of one or more second images having overlapping regions with the reference image and one or more third exposure brightnesses of the reference image.

In some embodiments, the processing device 140 may obtain the plurality of first images captured by the plurality of first cameras, and then select the reference image among the plurality of first images. The exposure mode of each first camera may be automatic exposure. In some embodiments, the processing device 140 may select a first image corresponding to middle pixels of a digitally stitched image as the reference image. The digitally stitched image may be generated by digitally stitching the plurality of first mages. Alternatively, the processing device 140 may determine a luminance histogram for each first image, and determine a first image with the most uniform brightness as the reference image based on the luminance histogram of each first image.

In some embodiments, the processing device 140 may select one or more reference images based on the number of cameras. For example, if the multi-view camera includes two cameras or three cameras, the processing device 140 may select only one reference image. As another example, if the multi-view camera includes four or more cameras, the processing device 140 may select two or more reference images. The processing device 140 may determine one or more second images that have overlapping regions with each of the one or more reference images. For example, if there is only one reference image, the processing device 140 may determine one or more second images overlapping with the reference image. As another example, if there are two reference images (e.g., reference image R1 and reference image R2), the processing device 140 may determine one or more second images overlapping with the reference image R1 and one or more second images overlapping with the reference image R2, respectively. In some embodiments, the processing device 140 may determine whether a first image and a reference image have an overlapping region and/or determine information relating to the overlapping region (e.g., a size of the overlapping region, a location of the overlapping region, or the like) using computer software (e.g., matlab software, OpenCV software, or the like).

In some embodiments, each of the one or more second exposure brightnesses may correspond to one of the one or more third exposure brightnesses. A second exposure brightness of a second image and a third exposure brightness of the reference image may correspond to an overlapping region of the second image and the reference image. The processing device 140 may extract the second exposure brightness of the second image and the corresponding third exposure brightness of the reference image at the overlapping region based on the overlapping region. Merely by way of example, for a second camera corresponding to the second image, the processing device 140 may obtain brightness values of a plurality of photosensitive elements of the image sensor of the second camera. The processing device 140 may determine a portion of the photosensitive elements that correspond to the overlapping region, and determine an average value of brightness values of the selected portion of photosensitive elements as the second brightness value. Similarly, for a reference camera corresponding to the reference image, the processing device 140 may obtain brightness values of a plurality of photosensitive elements of the image sensor of the reference camera. The processing device 140 may determine a portion of the photosensitive elements that correspond to the overlapping region, and determine an average value of brightness values of the selected portion of photosensitive elements as the third brightness value.

In 409, the processing device 140 (e.g., the second updating module 1105) may determine whether a second difference between a second exposure brightness of a second image and the corresponding third exposure brightness of the reference image is within a second difference-range.

The second difference-range may be a default difference-range or an empirical difference-range. For example, the second difference-range may be set according to a default setting of the image processing system 100 or the multi-view camera. As another example, the second difference-range may be a brightness tolerance range, e.g., within −5 and 5, within −5 and 10, or the like. In some embodiments, the second difference-range may be the same as or different from the first difference-range.

In response to a determination that the second difference is not within the second difference-range, the processing device 140 may proceed to operation 411. In 411, for a second camera corresponding to the second image, the processing device 140 (e.g., the second updating module 1105) may adjust the first exposure parameters of the second camera based on the second difference. The processing device 140 (e.g., the second updating module 1105) may update the first exposure brightness of the second camera based on the adjusted exposure parameters.

In some embodiments, the processing device 140 may adjust the first exposure parameters of the second camera based on the positive or negative of the second difference and/or the size of the second difference. For example, if the second difference is a positive value, the processing device 140 may decrease the first exposure parameters of the second camera according to the size of the second difference. As another example, if the second difference is a negative value, the processing device 140 may increase the first exposure parameters of the second camera according to the size of the second difference.

The processing device 140 may update the first exposure brightness of the second camera based on the adjusted exposure parameters. For example, the updated exposure brightness of the second camera may be determined by taking an image with the adjusted exposure parameters of the second camera. In some embodiments, the processing device 140 may designate the updated exposure brightness of the second camera as the first exposure brightness and the adjusted exposure parameters of the second camera as the first exposure parameters. Then the processing device 140 may proceed to operation 401 and start a next iteration. In some embodiments, operations 401 to 411 may be repeated until the second difference between the second exposure brightness and the corresponding third exposure brightness is within the second difference-range.

In response to a determination that the second difference is within the second difference-range, the processing device 140 may proceed to operation 413. In 413, the processing device 140 (e.g., the determination module 1107) may designate the first exposure parameters of each first camera as the current exposure parameters of the first camera.

If the first difference between the current exposure brightness and the predetermined exposure brightness is within the first difference-range and the second difference between the second exposure brightness and the third exposure brightness is within the second difference-range, the processing device 140 may designate the first exposure parameters of each first camera as the current exposure parameters of the first camera. Then the processing device 140 may control each first camera to capture images using the current exposure parameters of the first camera. The exposure mode of each first camera may be automatic exposure. The captured images may be digitally stitched into a stitched image.

The present disclosure considers the first exposure brightness of each first camera when adjusting the first exposure parameters of each first camera, which may reduce the brightness difference between images obtained by the first cameras and the actual scenes, and avoid the exposure abnormalities (e.g., overexposure, underexposure) in the images. Besides, when adjusting the first exposure parameters of each first camera, the present disclosure considers exposure brightnesses at an overlapping region of two images that have the overlapping region, such that the stitched image at the overlapping region (also referred to as stitching region) has uniform exposure brightness.

It should be noted that the above description regarding the process 400 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, in operation 407, after the reference image and the second image is determined, the processing device 140 may extract a second exposure brightness corresponding to the whole second image and a third exposure brightness corresponding to the whole reference image. Specifically, the second exposure brightness of the second image may be an average value of brightness values of the plurality of photosensitive elements of the image sensor of the second camera. The third exposure brightness of the reference image may be an average value of brightness values of the plurality of photosensitive elements of the image sensor of the reference camera.

Figure 5:
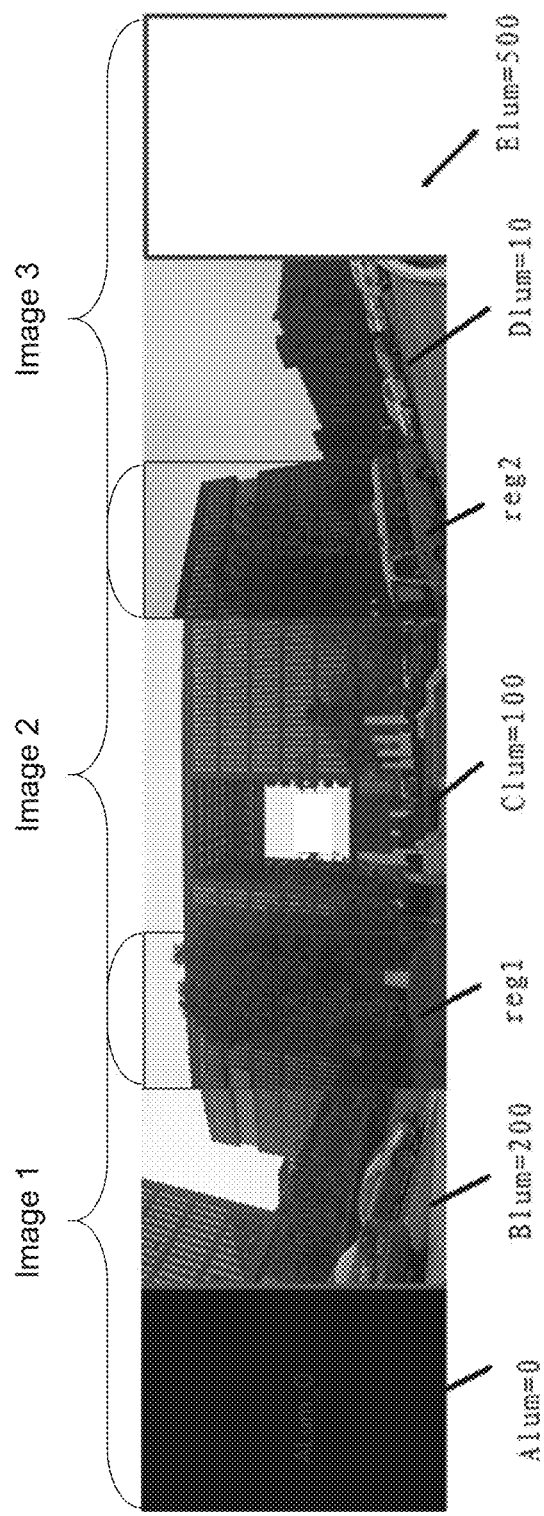
FIG. 5 is a schematic diagram illustrating a digitally stitched image according to some embodiments of the present disclosure.

FIG. 5 is a schematic diagram illustrating a digitally stitched image according to some embodiments of the present disclosure. As shown in FIG. 5, the stitched image may be digitally stitched by three image, i.e., image 1, image 2, and image 3. The image 1 may be captured by a camera 1, the image 2 may be captured by a camera 2, and the image 3 may be captured by a camera 3. The image 1 and the image 2 have an overlapping region reg2. The image 2 and the image 3 have an overlapping region reg3. The actual exposure brightness of region A (marked as Alum) in the image 1 is 0, and the actual exposure brightness of region B (marked as Blum) in the image 1 is 200. The actual exposure brightness of region C (marked as Clum) in the image 2 is 100. The actual exposure brightness of region D (marked as Dlum) in the image 3 is 10, and the actual exposure brightness of region E (marked as Elum) in the image 3 is 500.

In prior art, a camera of the multi-view camera may be set as a reference camera. The exposure mode of the reference camera may be automatic exposure, and the exposure mode of the other camera(s) may be manual exposure. For example, if the camera 1 is a reference camera which perform automatic exposure based on a predetermined exposure brightness, exposure parameters (e.g., an exposure time, gain, etc.) of the camera 1 may be automatically adjusted to match the predetermined exposure brightness. As shown in FIG. 5, since the region A of the image 1 has relatively small brightness, in order to match the predetermined exposure brightness, the exposure time and the gain of the camera 1 may be set with relatively large values. If the camera 2 and/or camera 3 capture images using the exposure parameters (e.g., the exposure time, the gain, etc.) of the camera 1, the captured images by the camera 2 and the camera 3 may be overexposed. That is, the image 1 may be normal, the image 2 and the image 3 may be overexposed. In prior art, an alternative approach may be applied, i.e., the exposure mode of each camera of the multi-view camera being automatic exposure. In this case, the image 2 may be normal, the region B in the image 1 may be overexposed, and the region D in the image 3 may be underexposed, which may result in non-uniform of exposure brightness at the overlapping regions reg1 and reg2.

According to the process described in the present disclosure, the current exposure brightness of the multi-view camera may be determined based on exposure brightnesses of the three cameras (e.g., camera 1, camera 2, camera 3). When a first difference between the current exposure brightness of the multi-view camera and a predetermined exposure brightness is not within a first difference-range. The exposure parameters of the three cameras may be adjusted according to the first difference until the first difference is within the first difference-range. In the present disclosure, the exposure brightness of each camera may be considered when determining the exposure parameters of each camera, which may avoid the exposure abnormalities of the captured images. Thus, the images (e.g., image 1, image 2, image 3)

captured by the three cameras with the adjusted exposure parameters may be normal. Besides, when the first difference is within the first difference-range, image 2 may be regarded as a reference image. Image 1 and image 3 may be images that have overlapping regions with the reference image. A second exposure brightness of the image 1 (or image 3) at the overlapping region reg1 (or reg2) and a third exposure brightness of image 2 at the overlapping region reg1 (or reg2) may be extracted. When a second difference between the second exposure brightness and the third exposure brightness is not within a second difference-range, the exposure parameters of the corresponding camera 1 (or camera 3) may be adjusted according to the second difference until the second difference is within the second difference-range. In the present disclosure, the exposure brightness at the overlapping regions reg1 and reg2 may be considered such that the stitched image at the overlapping region (reg1 and reg2) has uniform exposure brightness.

As described in operation 411 of the process 400, the first exposure parameters of a second camera may be adjusted, and the first exposure brightness of the second camera may be updated based on the adjusted exposure parameters. Then the processing device 140 may return to operation 401 of the process 400 and start a new iteration. When the processing device 140 determines the current exposure brightness of the multi-view camera according to the updated exposure brightness of the second camera, the current exposure brightness determined in the new iteration may be different from the current exposure brightness in a prior iteration, which may result in the first difference between the current exposure brightness and the predetermined exposure brightness is not within the first difference-range, causing flicker phenomenon when exposure. In some embodiments, to avoid or reduce the flicker phenomenon, the processing device 140 may determine a correction coefficient for the second camera when updating the first exposure brightness based on the adjusted exposure parameters. The correction coefficient of the second camera may be used as a weight of the second camera when the processing device 140 determines the current exposure brightness of the multi-view camera, such that the current exposure brightness of the multi-view camera is substantially unchanged.

In some embodiments, to determine the correction coefficient of the second camera, the processing device 140 may determine a fourth exposure brightness of the second camera based on the adjusted exposure parameters. The processing device 140 may determine a ratio of the first exposure brightness (i.e., the first exposure brightness in operation 401) to the fourth exposure brightness (i.e., the updated exposure brightness in operation 411) as the correction coefficient of the second camera. More descriptions regarding the determination of the correction coefficient of the second camera may be found in, e.g., FIG. 6 and the descriptions thereof.

Figure 6:
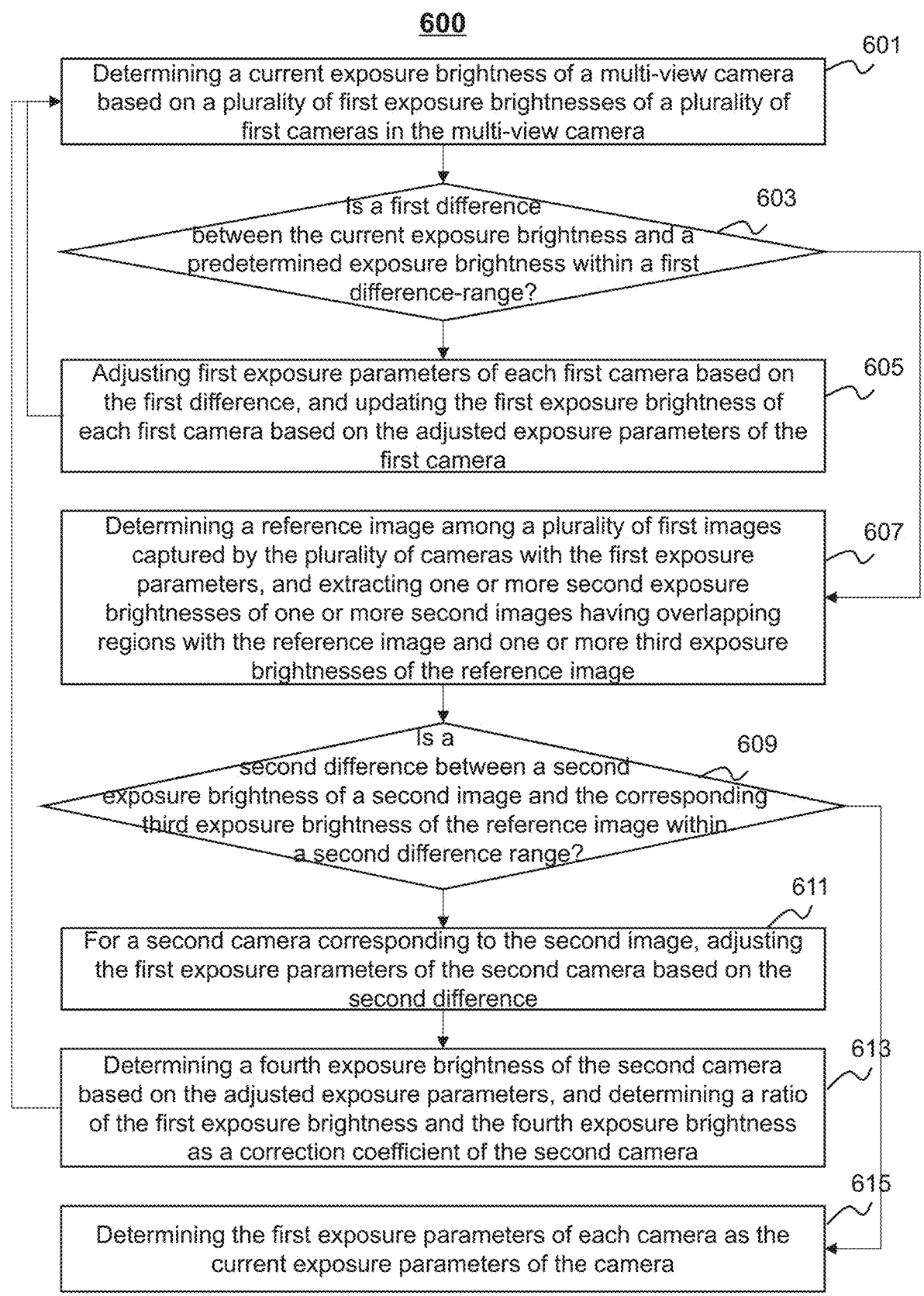
FIG. 6 is a flowchart illustrating an exemplary process 600 for determining exposure parameters of each camera in a multi-view camera according to some embodiments of the present disclosure.

FIG. 6 is a flowchart illustrating an exemplary process 600 for determining exposure parameters of each camera in a multi-view camera according to some embodiments of the present disclosure. For illustration purpose only, the processing device 140 may be described as a subject to perform the process 600. However, one of ordinary skill in the art would understand that the process 600 may also be performed by other entities. For example, one of ordinary skill in the art would understand that at least a portion of the process 600 may also be implemented on the computing device 200 as illustrated in FIG. 2 or the mobile device 300 as illustrated in FIG. 3. In some embodiments, one or more operations of process 600 may be implemented in the image processing system 100 as illustrated in FIG. 1. In some embodiments, one or more operations in the process 600 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in the form of electronic current or electrical signals.

In 601, the processing device 140 (e.g., the first judgment module 1101) may determine a current exposure brightness (also referred to as a reference exposure brightness) of a multi-view camera based on a plurality of first exposure brightnesses of a plurality of first cameras in the multi-view camera. In some embodiments, the processing device 140 may determine a weighted average of the plurality of first exposure brightnesses of the plurality of first cameras as the current exposure brightness of the multi-view camera. In 603, the processing device 140 (e.g., the first judgment module 1101) may determine whether a first difference between the current exposure brightness and a predetermined exposure within a first difference-range. Merely by way of example, a multi-view camera may include three cameras (marked as camera 4, camera 5, camera 6), the first exposure brightnesses of which may be A, B, C, respectively. If the weights of the three cameras are the same, the current exposure brightness of the multi-view camera may be avgY=(A+B+C)/3. It is assumed that the current exposure brightness avgY is within the first difference-range.

In response to a determination that the first difference is not within the first difference-range, the processing device 140 may proceed to operation 605. In 605, the processing device 140 (e.g., the first updating module 1103) may adjust first exposure parameters of each first camera based on the first difference, and update the first exposure brightness of each first camera based on the adjusted exposure parameters of the first camera. The first exposure parameters may include an exposure time, a gain value, or the like. The processing device 140 may designate the updated exposure brightness of each first camera as the first exposure brightness and the adjusted exposure parameters of each first camera as the first exposure parameters. The processing device 140 may return to operation 601 and start a next iteration. In some embodiments, operations 601 to 605 may be repeated until the first difference is within the first difference-range. Alternatively, in response to a determination that the first difference is within the first difference-range, the processing device 140 may proceed to operation 607. In 607, the processing device 140 (e.g., the second updating module 1105) may determine a reference image among a plurality of first images captured by the plurality of cameras with the plurality of first exposure parameters. The processing device 140 (e.g., the second updating module 1105) may also extract one or more second exposure brightnesses of one or more second images having overlapping regions with the reference image and one or more third exposure brightnesses of the reference image. In 609, the processing device 140 (e.g., the second updating module 1105) may determine whether a second difference between a second exposure brightness of a second image and the corresponding third exposure brightness of the reference image is within a second difference-range. In response to a determination that the second difference is not within the second difference-range, the processing device 140 may proceed to operation 611. Alternatively, in response to a determination that the second difference is within the second difference-range, the processing device 140 may proceed to operation 615. Operations 601 to 609 may be performed in a similar manner with operations 401 to 409, and the descriptions thereof are not repeated here.

In 611, for a second camera corresponding to the second image, the processing device 140 (e.g., the second updating module 1105) may adjust the first exposure parameters of the second camera based on the second difference. In some embodiments, the processing device 140 may adjust the first exposure parameters of the second camera based on the positive or negative of the second difference and/or the size of the second difference. For example, if the second difference is a positive value, the processing device 140 may decrease the first exposure parameters of the second camera according to the size of the second difference. As another example, if the second difference is a negative value, the processing device 140 may increase the first exposure parameters of the second camera according to the size of the second difference. In 613, the processing device 140 (e.g., the second updating module 1105) may determine a fourth exposure brightness of the second camera based on the adjusted exposure parameters. For example, the fourth exposure brightness of the second camera may be determined by taking an image with the adjusted exposure parameters of the second camera. The processing device 140 (e.g., the second updating module 1105) may further determine a ratio of the first exposure brightness and the fourth exposure brightness as a correction coefficient of the second camera. The processing device 140 may designate the fourth (or updated) exposure brightness of the second camera as the first exposure brightness and the adjusted exposure parameters of the second camera as the first exposure parameters. Then processing device 140 may return to operation 601, and start a next iteration. In 601, the weight of the second camera may be updated based on the correction coefficient of the second camera. Thus, the current exposure brightness may be determined based on the plurality of first exposure brightness and the correction coefficient of the second camera.

In the above example, it is assumed that the camera 5 is the reference camera and the camera 4 and camera 6 are the second cameras. If the second exposure brightness of the camera 4 (or camera 6) and the third exposure brightness of the camera 5 is not within the second difference-range, the processing device 140 may adjust the exposure parameters of the camera 4 (or camera 6), and determine a fourth exposure brightness of the camera 4 (or camera 6). In some embodiments, the fourth exposure brightness of the camera 4 may be marked as $Y\_a$, and the fourth exposure brightness of the camera 6 may be marked as $Y\_c$. The correction coefficient of the camera 4 may be $w1=A/Y\_a$. The correction coefficient of the camera 6 may be $w3=C/Y\_c$. The weights of the camera 4 and the camera 6 may be updated by its corresponding correction coefficients. In the next iteration, the current exposure brightness of the multi-camera may be determined as $avgY1=(w1*Y\_a+B+w3*Y\_c)/3=((A/Y\_a)*Y\_a+B+(C/Y\_c)*Y\_a)/3=(A+B+C)/3$. That is, $avgY1=avgY$. Thus, the flicker phenomenon may be avoided or reduced.

In 615, the processing device 140 (e.g., the determination module 1107) may determine the first exposure parameters of each camera as the current exposure parameters of the camera. If the first difference between the current exposure brightness and the predetermined exposure brightness is within the first difference-range and the second difference between the second exposure brightness and the third exposure brightness is within the second difference-range, the processing device 140 may designate the first exposure parameters of each first camera as the current exposure parameters of the first camera. Then the processing device 140 may control each first camera to capture images using the current exposure parameters of the first camera. In some embodiments, the exposure mode of each first camera may be automatic exposure. The captured images may be digitally stitched into a stitched image.

In the present disclosure, when updating the first exposure brightness of the second camera, the processing device 140 may also determine a correction coefficient for the second camera. The correction coefficient of the second camera may be used to update the weight of the second camera to ensure that the current exposure brightness is nearly unchanged, thus avoiding the flicker phenomenon.

In some embodiments, before performing the process 400 or the process 600, the processing device 140 may obtain a plurality of third images by the plurality of cameras with the plurality of first exposure parameters (i.e., the initial exposure parameters in the first iteration). The exposure mode of each of the plurality of cameras may be automatic exposure. The processing device 140 may identify two or more third images that overlaps with each other. The processing device 140 may determine whether a size of an overlapping region between two third images that have the overlapping region satisfies a predetermined size (also referred to as a size criterion). For instance, the processing device 140 may determine whether two third images have an overlapping region. If the two third images have the overlapping region, the processing device 140 may further determine whether a size of the overlapping region satisfies the predetermined size. The predetermined size may be a default value or an empirical value relating to the image processing system 100 or the multi-view camera. In some embodiments, the predetermined size may be set based on a size of the third image(s). For example, the predetermined size and the size of the third image(s) may satisfy a fixed proportion. In some embodiments, the predetermined size may be 400*800, 500*800, or the like. In response to a determination that size of the overlapping region satisfies the predetermined size, the processing device 140 may start to perform the process 400 or 600. In some embodiments, considering the size of the overlapping region(s) may improve the stability and quality of a stitched image that are digitally stitched by a plurality of images.

Figure 7:
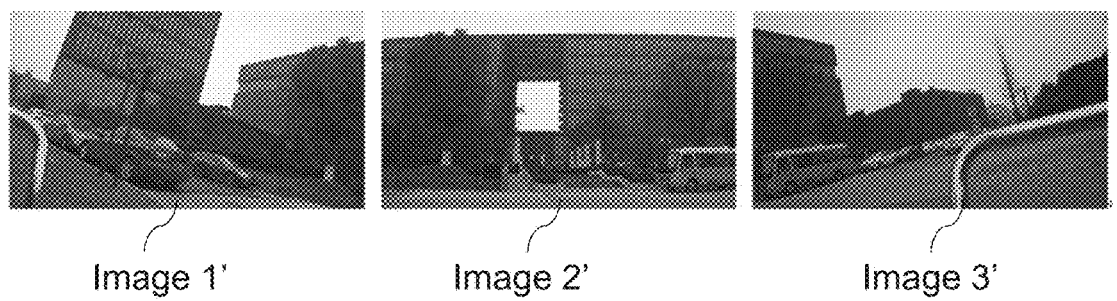
FIG. 7 shows three images, each taken by a camera in a multi-view camera.
Figure 8:
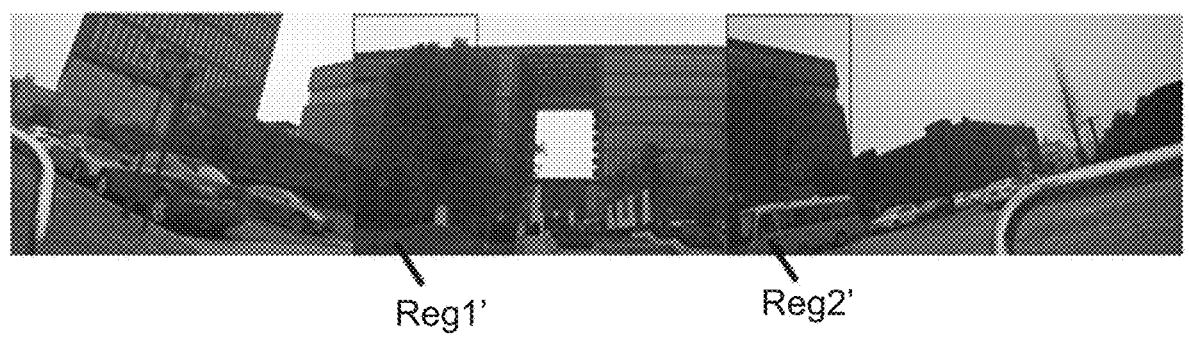
FIG. 8 shows the three images illustrated in FIG. 7 and their overlapping regions according to some embodiments of the present disclosure.
Figure 9:
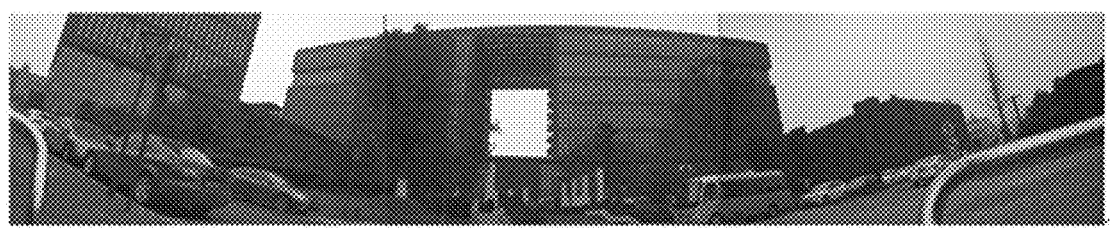
FIG. 9 shows a digitally stitched image generated by three images according to some embodiments of the present disclosure.

FIG. 7 shows three images and FIG. 8 shows the three images and their overlapping regions according to some embodiments of the present disclosure. The three images may be captured by three cameras of a multi-view camera with its initial exposure brightnesses. The processing device 140 may determine whether the three images have overlapping region(s) using computer software (e.g., matlab software, OpenCV software, or the like). As shown in FIG. 8, the image 1' and the image 2' have a first overlapping region reg1'. The image 2' and the image 3' have a second overlapping region reg2'. The processing device 140 may determine the size of the overlapping region reg1' (or reg2') using the computer software (e.g., matlab software, OpenCV software, or the like) and determine whether the overlapping region reg1' (or reg2') satisfies the predetermined size 400*800. The size of the overlapping region reg1' (or reg2') is determined as 480*800, satisfying the predetermined size 400*800. Thus, the processing device 140 may then determine the exposure parameters of each camera according to the process 400 or process 600 disclosed in the present disclosure. FIG. 9 shows a digitally stitched image generated by three images. The three images may be captured by the three cameras with the exposure parameters determined according to the present disclosed process (e.g., process 40 or process 600). As shown in FIG. 9, the exposure brightnesses of the stitched image are normal and the exposure brightness at the overlapping region (e.g., reg1', reg2') is uniform.

Figure 10:
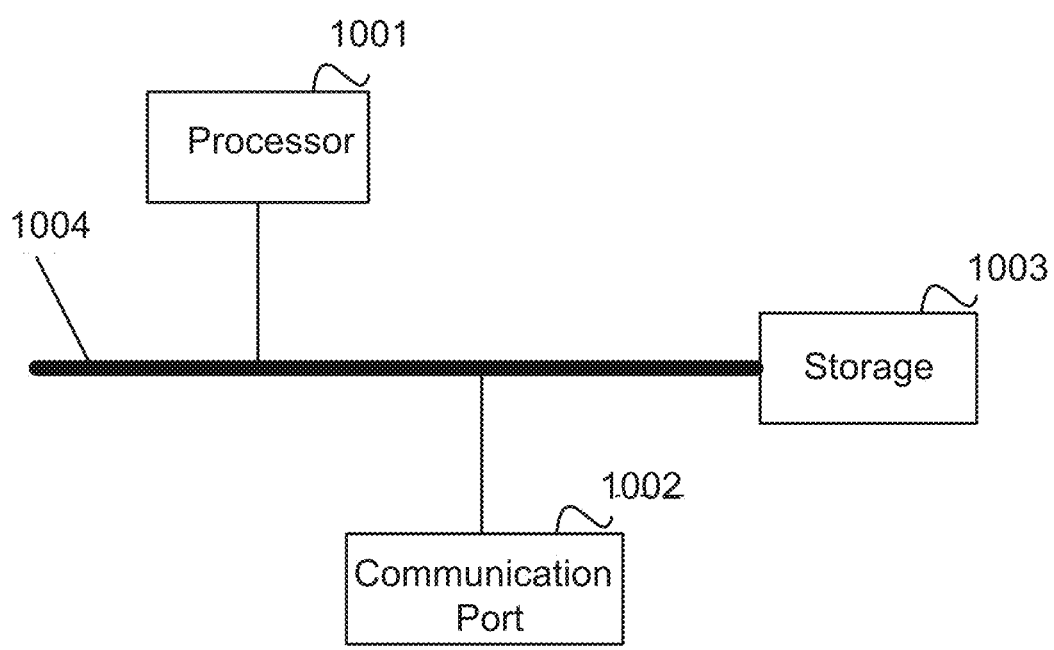
FIG. 10 is a schematic diagram illustrating an exemplary multi-view camera 1000 according to some embodiments of the present disclosure.

FIG. 10 is a schematic diagram illustrating an exemplary multi-view camera 1000 according to some embodiments of the present disclosure. The multi-view camera may include a processor 1001, a communication port 1002, a storage 1003, and a bus 1004.

In some embodiments, the bus 1004 may be configured to facilitate communication between the processor 1001, the communication port 1002, and the storage 1003. In some embodiments, the bus 1004 may be a peripheral component interconnect (PCI) bus, an extended industry standard architecture (EISA) bus, or the like. The bus 1004 may be an address bus, a data bus, a control bus, or the like. For briefly, in FIG. 10, the bus 1004 is indicated by a line.

The communication port 1002 may be configured to facilitate data communications. For example, the communication port 1002 may establish connection between the multi-view camera and other devices (e.g., the terminal 130). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof.

The storage 1003 may be configured to store computer programs. The storage 1003 may include a mass storage device (e.g., a magnetic disk, an optical disk, a solid-state drive, etc.), a removable storage device (e.g., a flash drive, a floppy disk, an optical disk, a memory card, a zip disk, a magnetic tape, etc.), a volatile read-and-write memory (e.g., a random access memory (RAM)), a read-only memory (ROM), or the like, or any combination thereof.

The processor 1001 may be configured to execute computer programs. In some embodiments, the processor 1001 may include one or more hardware processors, such as a network processor (NP), a digital signal processor (DSP), a reduced instruction set computer (RISC), an application specific integrated circuit (ASIC), an application-specific instruction-set processor (ASIP), a central processing unit (CPU), a graphics processing unit (GPU), a physics processing unit (PPU), a microcontroller unit, a field programmable gate array (FPGA), an advanced RISC machine (ARM), a programmable logic device (PLD), any circuit or processor capable of executing the computer programs.

When executing the computer programs, the processor 1001 may perform operations including:

A: determining a weighted average of a plurality of exposure brightnesses of a plurality of first cameras as a current exposure brightness of the multi-view camera; determining whether a first difference between the current exposure brightness and a predetermined exposure brightness is within a first difference-range; if no, proceeding to B; if yes, proceeding to C;

B: adjusting first exposure parameters of each first camera based on the first difference; updating the first exposure brightness of each first camera based on the adjusted exposure parameters, the first exposure parameters including an exposure time and a gain value; and returning to A;

C: selecting a reference image among a plurality of first images captured by the plurality of first cameras with the first exposure parameters; extracting one or more second exposure brightnesses of one or more second images having overlapping regions with the reference image and one or more third exposure brightnesses of the reference image; determining whether a second difference between a second exposure brightness of a second image and a corresponding third exposure brightness of the reference image is within a second difference-range; if no, for a second camera corresponding to the second image, adjusting the first exposure parameters of the second camera, updating the first exposure brightness of the second camera based on the adjusted exposure parameters of the second camera, and returning to A; if yes, proceeding to D; and D: determining the first exposure parameters of each first camera as the current exposure parameters of the first camera.

The present disclosure also provides a computer-readable storage medium. The computer-readable storage medium may store computer programs that can be executed by a processor of a multi-view camera. The computer-readable storage medium may include any medium or data storage accessed by the processor, such as a magnetic storage (e.g., a floppy disk, a hard disk, a magnetic tape, a magneto-optical disk), an optical storage (e.g., a compact disc (CD), a digital video disc (DVD), a blu-ray disc (BD), a High-definition Versatile Disc (HVD)), a semiconductor storage (e.g., a read only memory (ROM), an electrically programmable read only memory (EPROM), an electrically erasable programmable read only memory (EEPROM), a nonvolatile memory (NVM), a solid state disk (SSD)), or the like, or any combination thereof. In some embodiments, when the computer programs run on the multi-view camera, cause the processor of the multi-view camera to perform operations including:

A: determining a weighted average of a plurality of exposure brightnesses of a plurality of first cameras as a current exposure brightness of the multi-view camera; determining whether a first difference between the current exposure brightness and a predetermined exposure brightness is within a first difference-range; if no, proceeding to B; if yes, proceeding to C;

B: adjusting first exposure parameters of each first camera based on the first difference; updating the first exposure brightness of each first camera based on the adjusted exposure parameters, the first exposure parameters including an exposure time and a gain value; and returning to A;

C: selecting a reference image among a plurality of first images captured by the plurality of first cameras with the first exposure parameters; extracting one or more second exposure brightnesses of one or more second images having overlapping regions with the reference image and one or more third exposure brightnesses of the reference image; determining whether a second difference between a second exposure brightness of a second image and a corresponding third exposure brightness of the reference image is within a second difference-range; if no, for a second camera corresponding to the second image, adjusting the first exposure parameters of the second camera, updating the first exposure brightness of the second camera based on the adjusted exposure parameters of the second camera, and returning to A; if yes, proceeding to D; and D: determining the first exposure parameters of each first camera as the current exposure parameters of the first camera.

Figure 11:
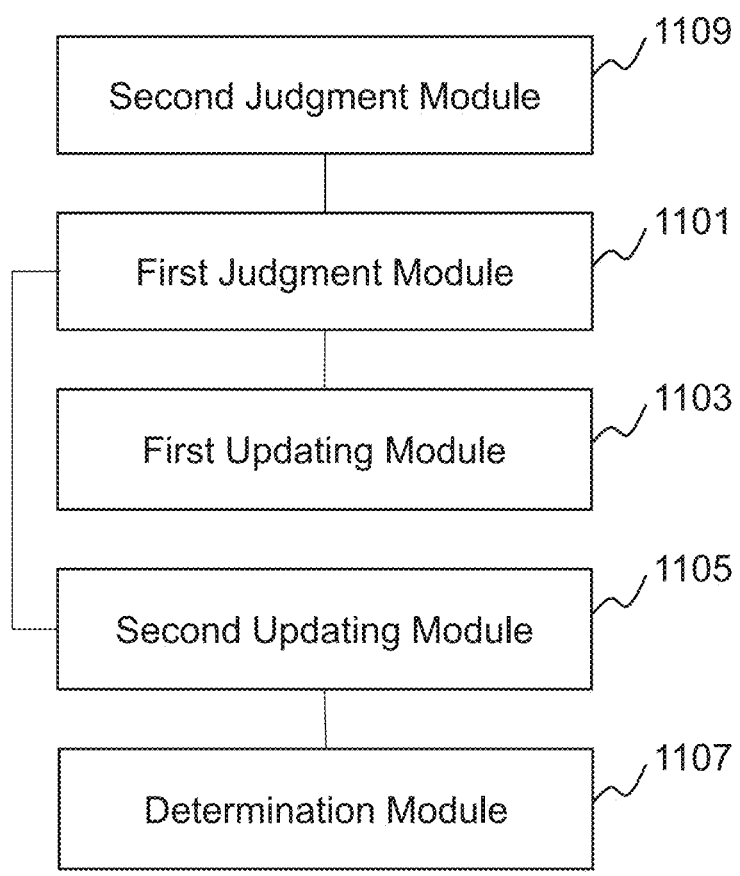
FIG. 11 is a block diagram illustrating an exemplary exposure parameters determination apparatus 1100 according to some embodiments of the present disclosure.

FIG. 11 is a block diagram illustrating an exemplary exposure parameters determination apparatus 1100 according to some embodiments of the present disclosure. The exposure parameters determination apparatus 1100 may include a first judgment module 1101, a first updating module 1103, a second updating module 1105, a determination module 1107, and a second judgment module 1109.

The first judgment module 1101 may be configured to determine a weighted average of a plurality of exposure brightnesses of a plurality of first cameras as a current exposure brightness of the multi-view camera. The first judgment module 1101 may also be configured to determine whether a first difference between the current exposure brightness and a predetermined exposure brightness is within a first difference-range. If no, the first judgment module 1101 may trigger the first updating module 1103. Alternatively, if yes, the first judgment module 1101 may trigger the second updating module 1105.

The first updating module 1103 may be configured to adjust first exposure parameters of each first camera based on the first difference. The first updating module 1103 may also be configured to update the first exposure brightness of each first camera based on the adjusted exposure parameters. The first exposure parameters may include an exposure time and a gain value. The first updating module 1103 may then trigger the first judgment module 1101.

The second updating module 1105 may be configured to select a reference image among a plurality of first images captured by the plurality of first cameras with the first exposure parameters. The second updating module 1105 may also be configured to extract one or more second exposure brightnesses of one or more second images having overlapping regions with the reference image and one or more third exposure brightnesses of the reference image. The second updating module may be further configured to determine whether a second difference between a second exposure brightness of a second image and a corresponding third exposure brightness of the reference image is within a second difference-range. If no, for a second camera corresponding to the second image, the second updating module 1105 may adjust the first exposure parameters of the second camera, and update the first exposure brightness of the second camera based on the adjusted exposure parameters of the second camera. The second updating module 1105 may then trigger the first judgment module 1101. If yes, the second updating module 1105 may trigger the determination module 1107.

In some embodiments, the second updating module 1105 may determine the one or more second images that have overlapping regions with the reference image. For each second image, the second updating module 1105 may extract the second exposure brightness of the second reference image and the third exposure brightness of the reference image at the overlapping region based on the overlapping region of the second image and the reference image.

In some embodiments, the second updating module 1105 may further determine a fourth exposure brightness of the second camera based on the adjusted exposure parameters of the second camera. The second updating module 1105 may then determine a ratio of the first exposure brightness of the second camera to the fourth exposure brightness of the second camera as a correction coefficient of the second camera.

The determination module 1107 may be configured to determine the first exposure parameters of each first camera as the current exposure parameters of the first camera.

The second judgment module 1109 may be configured to obtain a plurality of third images by the plurality of cameras with the plurality of first exposure parameters (i.e., initial exposure parameters). The second judgment module 1109 may also be configured to determine whether a size of an overlapping region between two third images that have the overlapping region satisfies a predetermined size. If yes, the second judgment module 1109 may trigger the first judgment module 1101.

The exposure parameters determination apparatus 1100 in the present disclosure may be used to perform one or more operations of the process 400 as described in FIG. 4 or of the process 600 as described in FIG. 6. The implementation principle and technical effects of the exposure parameters determination apparatus 1100 may be similar to the process 400 or the process 600, which can refer to the descriptions in FIG. 4 or in FIG. 6 and is not repeated here.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Per, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

STATEMENT OF INVENTION

1. An exposure parameters determination method, applicable to a multi-view camera, comprising:

A: determining a weighted average of a plurality of exposure brightnesses of a plurality of first cameras as a current exposure brightness of the multi-view camera; determining whether a first difference between the current exposure brightness and a predetermined exposure brightness is within a first difference-range; if no, proceeding to B; if yes, proceeding to C;

B: adjusting first exposure parameters of each first camera based on the first difference; updating the first exposure brightness of each first camera based on the adjusted exposure parameters, the first exposure parameters including an exposure time and a gain value; and returning to A;

C: selecting a reference image among a plurality of first images captured by the plurality of first cameras with the first exposure parameters; extracting one or more second exposure brightnesses of one or more second images having overlapping regions with the reference image and one or more third exposure brightnesses of the reference image; determining whether a second difference between a second exposure brightness of a second image and a corresponding third exposure brightness of the reference image is within a second difference-range; if no, for a second camera corresponding to the second image, adjusting the first exposure parameters of the second camera, updating the first exposure brightness of the second camera based on the adjusted exposure parameters of the second camera, and returning to A; if yes, proceeding to D; and D: determining the first exposure parameters of each first camera as the current exposure parameters of the first camera.

2. The method of item 1, wherein the extracting one or more second exposure brightnesses of one or more second images having overlapping regions with the reference image and one or more third exposure brightnesses of the reference image comprises:

determining the one or more second images that have overlapping regions with the reference image; and for each second image, extracting the second exposure brightness of the second image and the corresponding third exposure brightness of the reference image at the overlapping region based on the overlapping region of the second image and the reference image.

3. The method of item 1, wherein the updating the first exposure brightness of the second camera based on the adjusted exposure parameters of the second camera comprises:

determining a fourth exposure brightness of the second camera based on the adjusted exposure parameters of the second camera; and determining a ratio of the first exposure brightness of the second camera to the fourth exposure brightness of the second camera as a correction coefficient of the second camera 4. The method of item 1, wherein before determining a weighted average of a plurality of exposure brightnesses of a plurality of first cameras as a current exposure brightness of the multi-view camera, the method further comprises:

obtaining a plurality of third images by the plurality of cameras with the plurality of first exposure parameters;

determining whether a size of an overlapping region between two third images that have the overlapping region satisfies a predetermined size; and if yes, proceeding to the subsequent operations.

5. The method of any of items 1-4, wherein an exposure mode of each of the plurality of first cameras is automatic exposure.

6. An exposure parameter determination apparatus, applicable to a multi-view camera, comprising:

a first judgment module configured to, determine a weighted average of a plurality of exposure brightnesses of a plurality of first cameras as a current exposure brightness of the multi-view camera; determine whether a first difference between the current exposure brightness and a predetermined exposure brightness is within a first difference-range; if no, trigger a first updating module; if yes, trigger a second updating module;

the first updating module configured to, adjust first exposure parameters of each first camera based on the first difference; update the first exposure brightness of each first camera based on the adjusted exposure parameters, the first exposure parameters including an exposure time and a gain value; and trigger the first judgment module;

the second updating module configured to, select a reference image among a plurality of first images captured by the plurality of first cameras with the first exposure parameters; extract one or more second exposure brightnesses of one or more second images having overlapping regions with the reference image and one or more third exposure brightnesses of the reference image; determine whether a second difference between a second exposure brightness of a second image and a corresponding third exposure brightness of the reference image is within a second difference-range; if no, for a second camera corresponding to the second image, adjust the first exposure parameters of the second camera, update the first exposure brightness of the second camera based on the adjusted exposure parameters of the second camera, and trigger the first judgment module; if yes, trigger a determination module; and the determination module configured to determine the first exposure parameters of each first camera as the current exposure parameters of the first camera.

7. The apparatus of item 6, wherein the second updating module is configured to: determine the one or more second images that have overlapping regions with the reference image; and for each second image, extract the second exposure brightness of the second reference image and the third exposure brightness of the reference image at the overlapping region based on the overlapping region of the second image and the reference image.

8. The apparatus of item 6, wherein the second updating module is configured to: determine a fourth exposure brightness of the second camera based on the adjusted exposure parameters of the second camera; and determine a ratio of the first exposure brightness of the second camera to the fourth exposure brightness of the second camera as a correction coefficient of the second camera.

9. The apparatus of item 6, further comprising:
a second judgment module configured to, obtain a plurality of third images by the plurality of cameras with the plurality of first exposure parameters; determine whether a size of an overlapping region between two third images that have the overlapping region satisfies a predetermined size; if yes, trigger the first judgment module.

10. The apparatus of any of items 6-9, wherein an exposure mode of each of the plurality of first cameras is automatic exposure.

11. A multi-view camera, comprising a processor, a communication port, a storage, and a bus, wherein the bus is configured to facilitate communication between the processor, the communication port, and the storage;

the storage is configured to store computer programs; and the processor is configured to, when executing the computer programs, performed the method of any one of items 1-5.

12. A computer-readable storage medium, storing computer programs, wherein when executed by a processor, the computer programs implements the method of any of items 1-5.

What is claimed is:

1. A system, comprising:
at least one storage device including a set of instructions for determining exposure parameters of each of a plurality of cameras in a multi-view camera;
at least one processing device in communication with the at least one storage device, wherein when executing the set of instructions, the at least one processor is configured to cause the system to:
initiate an iteration process including one or more iterations, each current iteration of the one or more iterations including:
determining a reference exposure brightness of the multi-view camera;
determining whether a first difference between the reference exposure brightness and a predetermined exposure brightness is within a first difference-range;
in response to a determination that the first difference is not within the first difference-range, for each camera of the plurality of cameras, updating a first exposure brightness of the camera by adjusting first exposure parameters of the camera, and re-initiating a current iteration; or
in response to a determination that the first difference is within the first difference-range, determining whether a second difference between a second exposure brightness of a second camera and a third exposure brightness of a reference camera is within a second difference-range, wherein the second exposure brightness and the third exposure brightness correspond to an overlapping region of digital images taken by the second camera and the reference camera;
in response to a determination that the second difference is not within the second difference-range, updating the first exposure brightness of the second camera by adjusting the first exposure parameters of the second camera; and re-initiating a current iteration, wherein updating the first exposure brightness of the second camera by adjusting the first exposure parameters of the second camera comprises:
adjusting the first exposure parameters of the second camera based on the second difference;
determining a fourth exposure brightness of the second camera based on the adjusted exposure parameters; and
determining a ratio of the first exposure brightness to the fourth exposure brightness as a correction coefficient of the second camera; or
in response to a determination that the second difference is within the second difference-range, terminating the iteration process; and
designating the first exposure parameters of each camera as the current exposure parameters of the camera.

2. The system of claim 1, wherein the first exposure parameters include an exposure time and a gain value.

3. The system of claim 1, further comprising determining the second exposure brightness of the second camera and the third exposure brightness of the reference camera by:
obtaining a plurality of first images by the plurality of cameras with the first exposure parameters;
determining, among the plurality of first images, a reference image and a second image that has the overlapping region with the reference image; and
extracting the second exposure brightness of the second camera corresponding to the second image and the third exposure brightness of the reference camera corresponding to the reference image based on the overlapping region.

4. The system of claim 1, wherein the reference exposure brightness of the multi-view camera is determined based on the first exposure brightnesses of the plurality of cameras with a process that comprises:
  determining a weighted average of the plurality of first exposure brightnesses of the plurality of cameras based on the correction coefficient of the second camera; and
  designating the weighted average as the reference exposure brightness of the multi-view camera.

5. The system of claim 1, wherein updating the first exposure brightness of each camera by adjusting the first exposure parameters of the each camera comprises:
  adjusting the first exposure parameters of each camera based on the first difference; and
  determining an updated exposure brightness of each camera based on the adjusted exposure parameters.

6. The system of claim 1, wherein before initiating the iteration process, the at least one processor is further configured cause the system to:
  obtain a plurality of third images by the plurality of cameras with the first exposure parameters;
  identify two or more third images that overlap with each other;
  determine whether a size of each overlapping region between the identified two or more third images satisfies a size criterion; and
  in response to a determination that the size of the each overlapping region satisfies the size criterion, initiate the iteration process.

7. The system of claim 6, wherein the size criterion is set based on a size of the identified two or more third images.

8. The system of claim 1, wherein an exposure mode of each of the plurality of cameras is automatic exposure.

9. The system of claim 1, wherein for a first iteration, the reference exposure brightness of the multi-view camera is determined based on a plurality of initial exposure brightnesses of the plurality of cameras, wherein the plurality of initial exposure brightnesses are determined based on a plurality of initial exposure parameters.

10. A method, for determining exposure parameters of each of a plurality of cameras in a multi-view camera, implemented on a computing device having at least one processor, at least one computer-readable storage medium, and a communication platform connected to a network, comprising:
  initiating an iteration process including one or more iterations, each current iteration of the one or more iterations including:
    determining a reference exposure brightness of the multi-view camera;
    determining whether a first difference between the reference exposure brightness and a predetermined exposure brightness is within a first difference-range;
      in response to a determination that the first difference is not within the first difference-range, for each camera of the plurality of cameras, updating a first exposure brightness of the camera by adjusting first exposure parameters of the camera, and re-initiating a current iteration; or
      in response to a determination that the first difference is within the first difference-range, determining whether a second difference between a second exposure brightness of a second camera and a third exposure brightness of a reference camera is within a second difference-range, wherein the second exposure brightness and the third exposure brightness correspond to an overlapping region of digital images taken by the second camera and the reference camera;
        in response to a determination that the second difference is not within the second difference-range, updating the first exposure brightness of the second camera by adjusting the first exposure parameters of the second camera; and re-initiating a current iteration, wherein updating the first exposure brightness of the second camera by adjusting the first exposure parameters of the second camera comprises:
          adjusting the first exposure parameters of the second camera based on the second difference;
          determining a fourth exposure brightness of the second camera based on the adjusted exposure parameters; and
          determining a ratio of the first exposure brightness to the fourth exposure brightness as a correction coefficient of the second camera; or
        in response to a determination that the second difference is within the second difference-range, terminating the iteration process; and
    designating the first exposure parameters of each camera as the current exposure parameters of the camera.

11. The method of claim 10, wherein the first exposure parameters include an exposure time and a gain value, and the method further comprises determining the second exposure brightness of the second camera and the third exposure brightness of the reference camera by:
  obtaining a plurality of first images by the plurality of cameras with the first exposure parameters;
  determining, among the plurality of first images, a reference image and a second image that has the overlapping region with the reference image; and
  extracting the second exposure brightness of the second camera corresponding to the second image and the third exposure brightness of the reference camera corresponding to the reference image based on the overlapping region.

12. The method of claim 10, wherein the reference exposure brightness of the multi-view camera is determined based on the first exposure brightnesses of the plurality of cameras with a process that comprises:
  determining a weighted average of the plurality of first exposure brightnesses of the plurality of cameras based on the correction coefficient of the second camera; and
  designating the weighted average as the reference exposure brightness of the multi-view camera.

13. The method of claim 10, wherein updating the first exposure brightness of each camera by adjusting the first exposure parameters of the each camera comprises:
  adjusting the first exposure parameters of each camera based on the first difference; and
  determining an updated exposure brightness of each camera based on the adjusted exposure parameters.

14. The method of claim 10, wherein before initiating the iteration process, the method comprises:
  obtaining a plurality of third images by the plurality of cameras with the first exposure parameters;
  identifying two or more third images that overlap with each other;
  determining whether a size of each overlapping region between the identified two or more third images satisfies a size criterion; and
  in response to a determination that the size of the each overlapping region satisfies the size criterion, initiating the iteration process.

15. The method of claim 14, wherein the size criterion is set based on a size of the identified two or more third images.

16. The method of claim 10, wherein an exposure mode of each of the plurality of cameras is automatic exposure.

17. The method of claim 10, wherein for a first iteration, the reference exposure brightness of the multi-view camera is determined based on a plurality of initial exposure brightnesses of the plurality of cameras, wherein the plurality of initial exposure brightnesses are determined based on a plurality of initial exposure parameters.

18. A non-transitory computer-readable storage medium, comprising at least one set of instructions for determining exposure parameters of each of a plurality of cameras in a multi-view camera, wherein when executed by at least one processor of a computing device, the at least one set of instructions directs the at least one processor to perform acts of:

initiating an iteration process including one or more iterations, each current iteration of the one or more iterations including:

determining a reference exposure brightness of the multi-view camera;

determining whether a first difference between the reference exposure brightness and a predetermined exposure brightness is within a first difference-range;

in response to a determination that the first difference is not within the first difference-range, for each camera of the plurality of cameras, updating a first exposure brightness of the camera by adjusting first exposure parameters of the camera, and re-initiating a current iteration; or in response to a determination that the first difference is within the first difference-range, determining whether a second difference between a second exposure brightness of a second camera and a third exposure brightness of a reference camera is within a second difference-range, wherein the second exposure brightness and the third exposure brightness correspond to an overlapping region of digital images taken by the second camera and the reference camera;

in response to a determination that the second difference is not within the second difference-range, updating the first exposure brightness of the second camera by adjusting the first exposure parameters of the second camera; and re-initiating a current iteration, wherein updating the first exposure brightness of the second camera by adjusting the first exposure parameters of the second camera comprises:

adjusting the first exposure parameters of the second camera based on the second difference;

determining a fourth exposure brightness of the second camera based on the adjusted exposure parameters; and determining a ratio of the first exposure brightness to the fourth exposure brightness as a correction coefficient of the second camera; or in response to a determination that the second difference is within the second difference-range, terminating the iteration process; and designating the first exposure parameters of each camera as the current exposure parameters of the camera.

\* \* \* \* \*